(12) United States Patent
Barrett

(10) Patent No.: US 6,502,787 B1
(45) Date of Patent: Jan. 7, 2003

(54) CONVERTIBLE VERTICAL TAKE-OFF AND LANDING MINIATURE AERIAL VEHICLE

(75) Inventor: Ronald Martin Barrett, Auburn, AL (US)

(73) Assignees: Micro Autonomous Systems LLC, Del Mar, CA (US); Singapore Technologies Dynamics PTE LTD, Singapore (SG)

(*) Notice: Subject to any disclaimer, the term of this patent is extended or adjusted under 35 U.S.C. 154(b) by 0 days.

(21) Appl. No.: 10/082,814

(22) Filed: Feb. 22, 2002

(51) Int. Cl.$^7$ ............................................... B64C 27/20
(52) U.S. Cl. ..................... 244/23 A; 244/7 B; 244/73 R
(58) Field of Search ............................. 244/7 B, 23 A, 244/23 D, 34 A, 73 R

(56) References Cited

U.S. PATENT DOCUMENTS

| | | | | |
|---|---|---|---|---|
| 3,065,932 A | * | 11/1962 | Herrmann | 244/15 |
| 3,138,349 A | * | 6/1964 | Piasecki | 224/230 |
| 5,295,643 A | * | 3/1994 | Ebbert et al. | 244/12.2 |
| 5,516,060 A | * | 5/1996 | McDonnell | 244/207 |
| 6,082,675 A | * | 7/2000 | Woodall et al. | 244/120 |

* cited by examiner

Primary Examiner—Robert P. Swiatek
(74) Attorney, Agent, or Firm—John L. Rogitz

(57) ABSTRACT

A vertical take-off and landing miniature aerial vehicle includes an upper fuselage segment and a lower fuselage segment that extend in opposite directions from a rotor guard assembly. A rotor rotates within the rotor guard assembly between the fuselage segments. Plural turning vanes extend from the rotor guard assembly beneath the rotor. Moreover, plural grid fins extend radially from the lower fuselage segment below the turning vanes. The aerial vehicle is capable of taking off and landing vertically. During flight, the aerial vehicle can hover and transition between a horizontal flight mode and a vertical flight mode using the grid fins.

30 Claims, 5 Drawing Sheets

CONVERTIBLE VERTICAL TAKE-OFF AND LANDING MINIATURE AERIAL VEHICLE

TECHNICAL FIELD OF THE INVENTION

The present invention relates generally to aircraft.

BACKGROUND OF THE INVENTION

In the past, attempts have been made to combine fixed wing airplanes with helicopters to achieve vertical take-off and landing (VTOL) capabilities. Examples include the Lockheed XFV-1 and the Convair XFY-1 Pogo.

The Pogo, for example, was thirty-one feet (31') long with a twenty-six (26') wide delta wing. A large vertical stabilizer above the wing was matched by an equally sized ventral fin below which could be jettisoned for an emergency horizontal landing. The first double transition from vertical flight to horizontal flight and back to a vertical landing by the Pogo was made on Nov. 2, 1954. The Pogo was flown until November 1956. The Lockheed XFV-1 never made a vertical takeoff and landing. The world's first operational vertical/short take-off and landing (VSTOL), the Harrier jump jet, was introduced in the 1960's and was used successfully in several military campaigns.

Fixed wing airplanes and helicopters have completely permeated worldwide commerce and warfare. Presently, they are used to move civilians, soldiers, goods, supplies, etc. to nearly any place in the world. Moreover, fixed wing airplanes and helicopters are used to quickly transport injured persons or organs to and from hospitals. Militaries, law enforcement agencies, and intelligence agencies also use them to chase criminals, target, spy, and gather any other type of information. VTOL and VSTOL aircrafts have been used infrequently for specific military missions, but these types of aircrafts have never achieved the widespread success of conventional fixed wing airplanes and helicopters due in part to the difficulty in powering and controlling them.

Smaller unmanned fixed wing airplanes and helicopters have proved useful for surveillance, lethal and non-lethal ordinance delivery, crowd control, targeting, etc. However, a relatively small, unmanned aircraft that can transition between vertical flight (like a helicopter) and horizontal flight (like a fixed wing airplane), has not been provided. Thus, the present invention recognizes that there is a need for a relatively small, unmanned aerial vehicle that can transition between a vertical flight mode and a horizontal flight mode and sustain either mode of flight.

SUMMARY OF THE INVENTION

An aerial vehicle includes a rotor guard assembly. An upper fuselage segment extends upwardly from the rotor guard assembly and a lower fuselage segment extends downwardly from the rotor guard assembly. Moreover, a rotor rotates within the rotor guard assembly between the upper fuselage segment and the lower fuselage segment. A turning vane flap extends from the rotor guard assembly below the rotor and a grid fin extends radially from the lower fuselage segment below the turning vane flap. The grid fin allows the aerial vehicle to transition between a vertical flight mode and a horizontal flight mode.

In a preferred embodiment, the aerial vehicle further includes an undercarriage that extends downwardly from the outer periphery of the rotor guard assembly. Also, a powerplant is installed in the lower fuselage segment adjacent to the rotor guard assembly. The power plant has a shaft that extends between the lower fuselage segment and the upper fuselage segment and the rotor is rigidly attached to the shaft.

Preferably, a fuel tank is installed in the upper fuselage segment adjacent to the rotor guard assembly. The fuel tank includes a bladder installed therein. The bladder is inflatable to pressurize fuel in the fuel tank. In a preferred embodiment, a fuel line leads from the fuel tank to the powerplant and is routed partially external to the rotor guard assembly. Also, a high pressure line leads from the powerplant to the bladder within the fuel tank and is routed partially external to the rotor guard assembly.

In a preferred embodiment, an upper cap is installed on the upper fuselage segment. One or more sensors are disposed within the upper cap. The sensor can be an optical sensor, an infrared (IR) sensor, a radio frequency (RF) sensor, a magnetic field sensor, a chemical sensor, an acoustic sensor, a motion sensor, etc. Additionally, one or more cameras can be disposed within the upper cap. The camera can be a video camera, a still camera, a digital video camera, a digital still camera, a color video camera, a black-and-white video camera, a thermal imaging camera, an infrared video camera, a night vision camera, etc.

Preferably, the aerial vehicle also includes a microprocessor within the upper fuselage segment. A transceiver is connected to the microprocessor and extends through the upper cap. In a preferred embodiment, the aerial vehicle further includes a global positioning satellite (G.P.S.) system within the upper fuselage segment. The G.P.S. system is also connected to the microprocessor.

In another aspect of the present invention, an aerial vehicle includes means for launching the vehicle vertically and means for flying the vehicle vertically. In this aspect, the aerial vehicle includes means for transitioning the vehicle from vertical flight to horizontal flight.

In still another aspect of the present invention, an aerial vehicle includes a fuselage that defines a longitudinal axis. A rotor guard assembly surrounds a portion of the fuselage in a plane perpendicular to the longitudinal axis. Moreover, a rotor rotates within the rotor guard assembly in a plane perpendicular to the longitudinal axis. In this aspect, a turning vane flap extends downwardly from the rotor guard. The turning vane flap has one end hingedly attached to the rotor guard and the turning vane flap rotates about a radial axis that extends radially from the longitudinal axis. Also in this aspect, a grid fin extends radially from the fuselage below the turning vane flap. The grid fin rotates about a central axis that extends radially from the longitudinal axis.

The present invention will now be described, by way of example, with reference to the accompanying drawings, in which:

DESCRIPTION OF AN EMBODIMENT OF THE INVENTION

Figure 1:
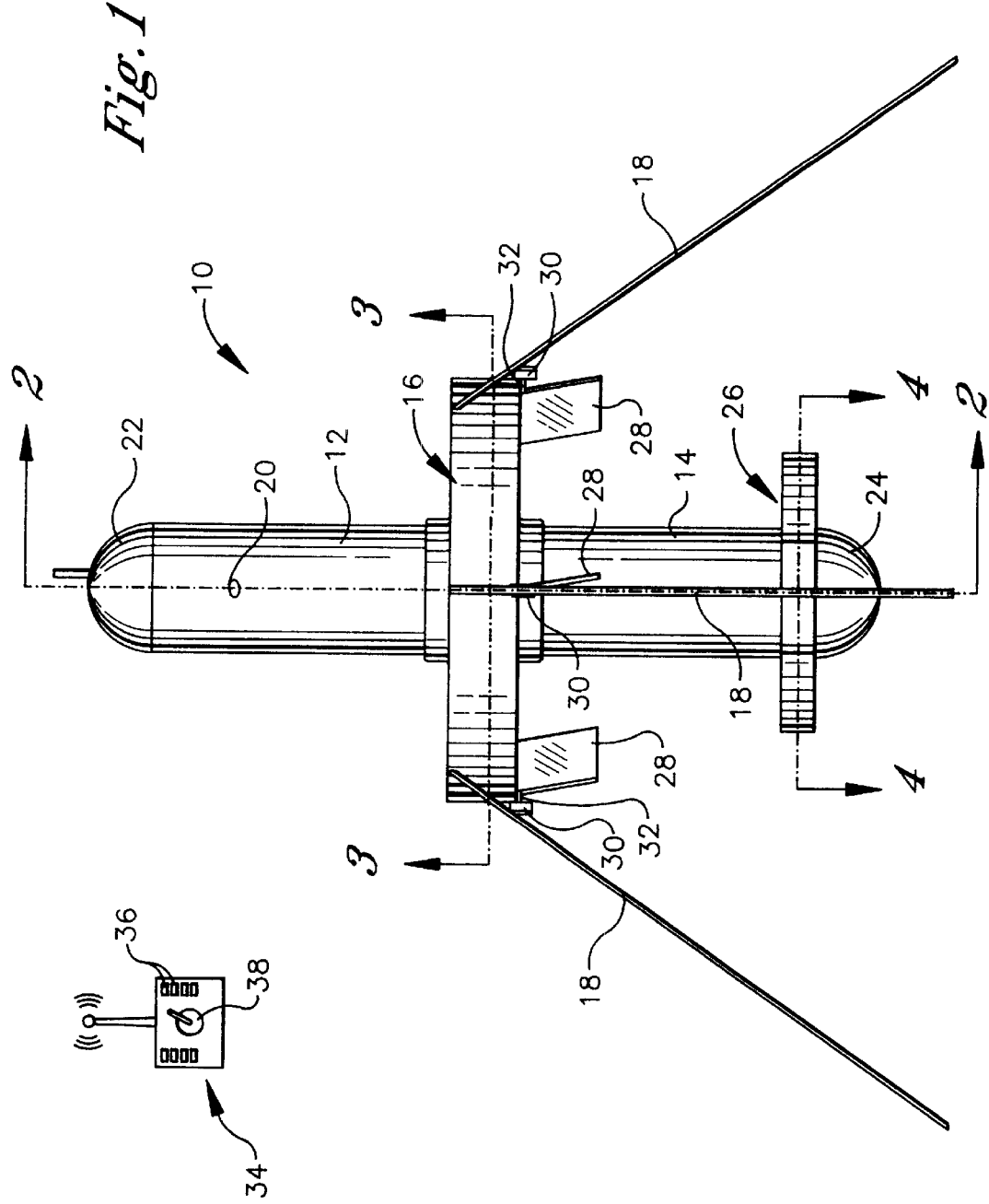
FIG. 1 is a side plan view of the aerial vehicle of the present invention.

Referring initially to FIG. 1, an aerial vehicle is shown and generally designated 10. FIG. 1 shows that the aerial vehicle 10 includes an upper fuselage segment 12 and a lower fuselage segment 14 that are connected by a rotor guard assembly 16. In a preferred embodiment, the fuselage segments 12, 14 are hollow tubular members which are open at each end. Preferably, the fuselage segments 12, 14 are made from a graphite epoxy composite, but can be made from any other suitable material well known in the art.

As mentioned above, the lower end of the upper fuselage segment 12 and the upper end of the lower fuselage segment 14 are engaged with the rotor guard assembly 16. FIG. 1 further shows that the aerial vehicle 10 includes an undercarriage that, in this non-limiting, exemplary embodiment, comprises six legs 18 that extend downwardly from the outer periphery of the rotor guard assembly 16. The legs 18 are equally spaced around the outer periphery of the rotor guard assembly 16 and are angled with respect to a longitudinal axis 20 defined by the aerial vehicle 10.

It is to be understood that the undercarriage can be fixed or retractable and can be configured to allow the aerial vehicle 10 to alight on surfaces of varying contour. As described above, the undercarriage is mounted on the outer periphery of the rotor guard assembly 16 and is structurally coupled to the turning vanes, described below, to allow loads on the undercarriage to be transferred to the upper fuselage segment 12 and the lower fuselage segment 14. Preferably, the undercarriage is made from a graphite epoxy composite, but can be made from any other suitable material well known in the art. The undercarriage can also include a quick release mechanism to allow it to drop-off after the aerial vehicle 10 is launched, e.g., for a one-way mission. Moreover, the undercarriage can be designed to absorb impacts caused by landing, e.g., using elastomeric polymers, shock-absorbing foam hinges, shock absorbing feet, etc.

As shown in FIG. 1, an upper cap 22 is installed on the upper end of the upper fuselage segment 12. A sensor bay, described in detail below, is established within the upper cap 22. A lower cap 24 is disposed on the lower end of the lower fuselage segment 14. As shown the upper cap 22 and the lower cap 24 are hemispherically shaped, but they can be any aerodynamically appropriate shape. It is to be understood that the lower cap 24 provides a smooth fairing off which boattail drag can be significantly reduced when the aerial vehicle is in airplane flight mode, e.g., like a conventional fixed-wing airplane. The lower cap 24 also protects the empennage 26, described in detail below, the lower fuselage segment 14, and the components within the lower fuselage segment 14 and empennage 26 from damage caused by dirt, debris, exhaust gases, impact, etc. The lower cap 24 is preferably made from an energy absorbing material. Thus, if any of the legs 18 are damaged during landing, the lower cap 20 can absorb the impact.

In a preferred embodiment, the aerial vehicle 10 includes plural, preferably six, turning vane flaps 28. The turning vane flaps 28 are equally spaced around the rotor guard assembly 16 and are placed beneath the rotor, described below. As described in detail below, each turning vane flap 28 is hingedly attached to a turning vane within the rotor guard assembly 16. Also, each turning vane flap 28 is aligned with a respective leg 18 extending from the rotor guard assembly 16. Moreover, a respective roll control servo 30, e.g., a rotary electro-mechanical servo-actuator, is connected to each turning vane flap 28 and controls the rotation thereof. Each roll control servo 30 is rigidly attached to the outer periphery of the rotor guard assembly 16 and includes a shaft 32 that is attached to a respective turning vane flap 28. It is to be understood that the roll control servos 30 are issued identical commands so as to roll the aerial vehicle 10.

Specifically, each turning vane flap 28 is rotated about its hinged end, through an axis extending radially from the longitudinal axis 20, in order to generate rolling moments around the longitudinal axis 20. Accordingly, the turning vane flaps 28 are designed to counter atmospheric effects and changes in rolling moments due to inertial loading or unloading.

In a preferred embodiment, the turning vane flaps 28 are fabricated from a structurally stiff material which is strong and light, e.g., a graphite epoxy composite, to allow for rapid transitions and increase the speed and responsiveness of the aerial vehicle 10 during rolling maneuvers. Preferably, the width of each turning vane flap 28 is such that the inner edge of each flap 28 is a greater distance from the central longitudinal axis 20 of the aerial vehicle 10 than the outer periphery of the empennage 26. Otherwise, the below-described grid fins that comprise the empennage 26 might counteract the motion of the aerial vehicle caused by the turning vane flaps 28.

FIG. 1 further shows that the aerial vehicle 10 can include a remote control unit 34. As shown, the remote control unit 34 can include plural control buttons 36 and a joy stick 38. Thus, the buttons 36 and the joy stick 28 can be used to control the flight of the aerial vehicle 10.

Figure 2:
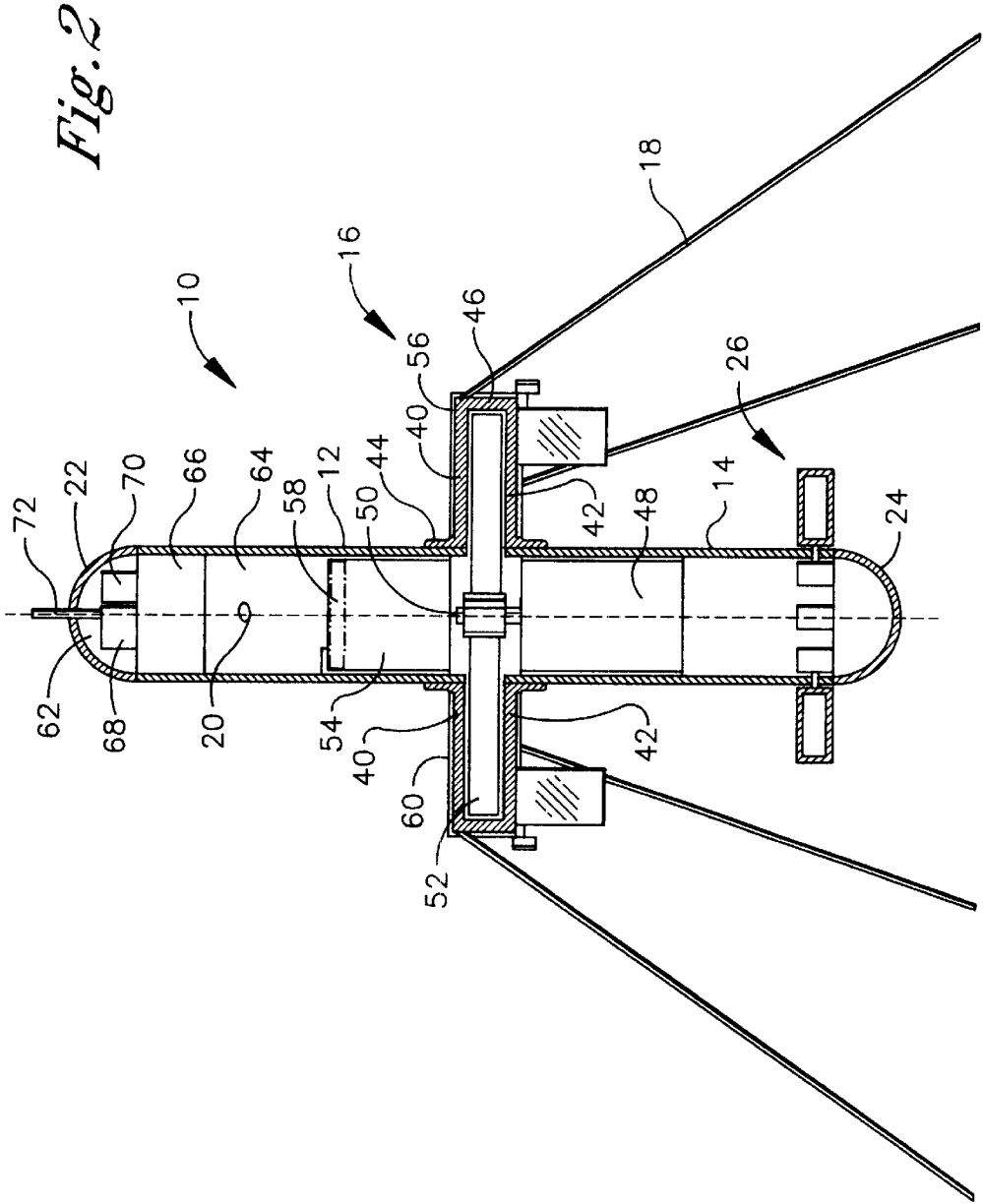
FIG. 2 is a cross-section view of the aerial vehicle taken along line 2—2 in FIG. 1.

Referring to FIG. 2, the aerial vehicle 10 is shown with the fuselage segments 12, 14, the caps 22, 24, and the rotor guard assembly 16 cross-sectioned to reveal the interior components of the aerial vehicle 10. FIG. 2 shows that the rotor guard assembly 16 includes plural upper turning vanes 40 and plural lower turning vanes 42 that extend radially from a generally cylindrical rotor guard hub 44 to a generally cylindrical rotor guard wall 46. As shown, the vanes 40, 42 are integrally formed with the rotor guard hub 44 and the rotor guard wall 46, but it can be appreciated that the vanes 40, 42, the hub 44, and the wall 46 can be formed separately and then attached to each other by a means well known in the art such as chemical welding. The lower end of the upper fuselage segment 12 and the upper end of the lower fuselage segment 14 are disposed within the rotor guard hub 44. Thus, the fuselage segments 12, 14 are supported by the rotor guard assembly 16.

It is to be understood that the rotor guard assembly 16 lends safety to the aerial vehicle and observers or objects in close proximity to the aerial vehicle 10. The rotor guard assembly 16 is designed so that lateral strike loads can be absorbed thereby during close-quarters hovering maneuvers. The rotor guard assembly 16 also increases the efficiency of the aerial vehicle 10 in that tip-effects of the rotor, described below, are reduced. It can be appreciated that the rotor guard assembly 16 can be lined with a rub strip to further reduce tip losses and it can be lined with anechoic materials to absorb acoustic energy. Further, the rotor guard assembly 16 can be penetrated and/or perforated for acoustic signature amelioration and accommodation of subsystem components. The rotor guard assembly 16 can also be fabricated from foil-thickness materials or it can have a thickness that is substantial enough to allow the rotor guard assembly 16 to house ancillary payloads.

FIG. 2 shows a powerplant 48 installed within the lower fuselage segment 14. It is to be understood that the powerplant 48 can be a micro turbine, a rotary engine, any type of internal combustion engine, or any type of electric motor. In this non-limiting, exemplary embodiment the powerplant 48 is an internal combustion engine. As shown, the powerplant 48 includes a shaft 50 that extends perpendicularly into the rotor guard assembly 16 within the space established between the ends of the fuselage segments 12, 14. A rotor 52 is rigidly attached to the shaft 50 and rotates perpendicularly to the longitudinal axis 20 within the rotor guard assembly 16. It is to be understood that the rotor 52 can have any number of blades and blade chords. Moreover the rotor 52 can be made of any suitable structural material well known in the art. Preferably, the rotor 52 extends from the center of the shaft 50 outward to the inner periphery of the rotor guard wall 46 in order to reduce tip losses which are normally encountered by free rotors. In a preferred embodiment the rotor 52 has a diameter from four inches to ten inches (4"–10"), but it can be as large as six feet (6') in diameter.

A preferably cylindrical fuel tank 54 is disposed in the upper fuselage segment 12 above the rotor 46. A fuel line 56 leads from the fuel tank 54, through the upper fuselage segment 12, through the rotor guard hub 44, along an upper turning vane 40, along the rotor guard wall 46, along a lower turning vane 42, through the rotor guard hub 44, through the lower fuselage segment 14, and into the powerplant 48.

In a preferred embodiment, the fuel tank 54 includes a sealed bladder 58 that is pressurized by an external gas source, e.g., the exhaust manifold of the powerplant 48, described below. It is to be appreciated that the bladder 58 ensures consistent flow of pressurized fuel to the powerplant 48. As shown, a pressure line 60 extends from the powerplant 48 to the bladder 58 and is routed thereto much like the fuel line 56 is routed from the fuel tank 54 to the powerplant 48. Preferably, the fuel tank 54 is located as close to the center of gravity of the aerial vehicle 10 as possible. Thus, as the fuel level within the fuel tank 54 changes during flight, the location of the center of gravity of the aerial vehicle will not significantly change.

As shown in FIG. 2, a sensor bay 62 is established within the upper cap 22 and an avionics bay 64 is established within the upper end of the upper fuselage segment 12 beneath the sensor bay 62. FIG. 2 shows that a microprocessor 66 is disposed within the avionics bay 64. Moreover, at least one sensor 68 and at least one camera 70 are disposed within the sensor bay 62. A transceiver 72 extends through the upper cap 22. The sensor 68 can be any type of sensor, e.g., an optical sensor, an infrared (IR) sensor, a radio frequency (RF) sensor, a magnetic field sensor, a chemical sensor, an acoustic sensor, a motion sensor, etc. Also, the camera 70 can be any type of camera, e.g., a video camera, a still camera, a digital video camera, a digital still camera, a color video camera, a black-and-white video camera, a thermal imaging camera, an infrared video camera, a night vision camera, etc.

Figure 3:
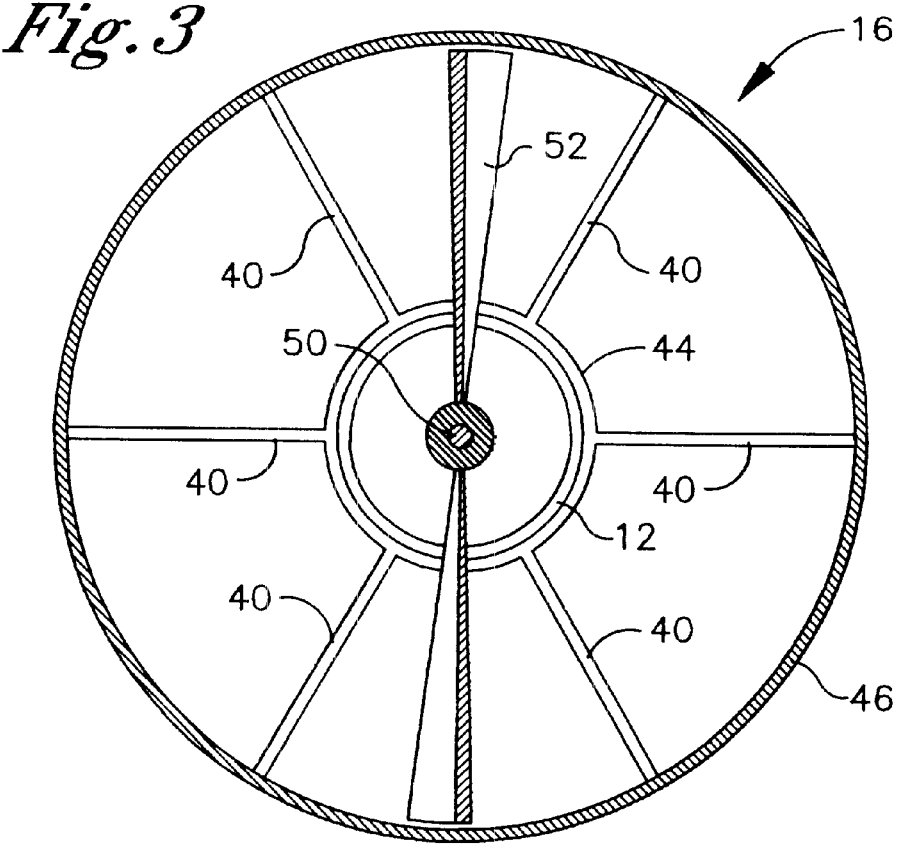
FIG. 3 is a cross-section view of the aerial vehicle taken along line 3—3 in FIG. 1.

Referring now to FIG. 3, in a preferred embodiment the rotor guard assembly 16 includes six upper turning vanes 40. It is to be understood that the preferred rotor guard assembly 16 also includes six lower turning vanes 42 (FIG. 2). Each lower turning vane 42 is aligned with a respective upper turning vane 40.

Figure 4:
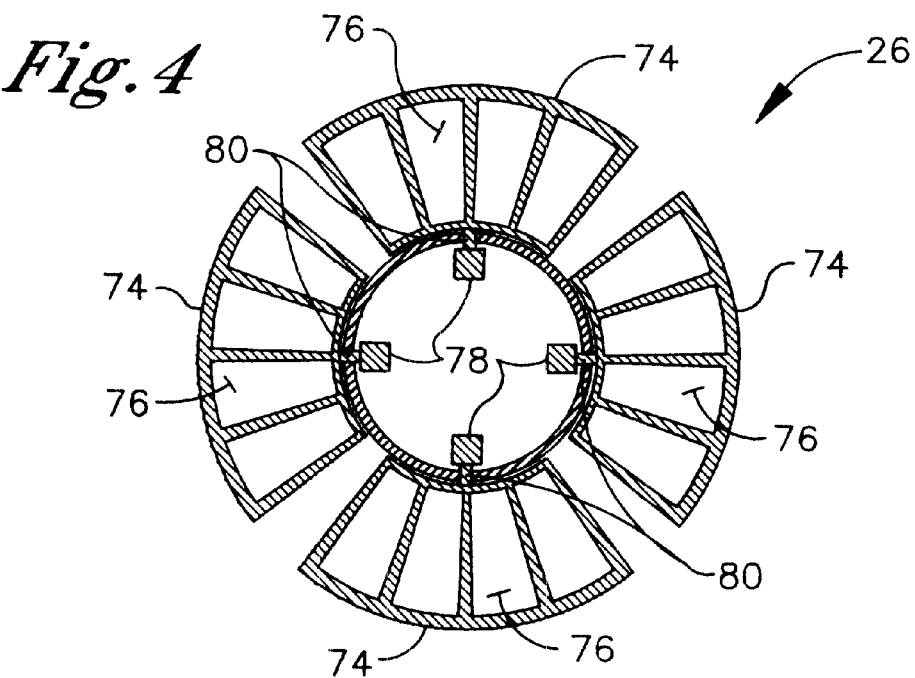
FIG. 4 is a cross-section view of the aerial vehicle taken along line 4—4 in FIG. 1.

FIG. 4 shows details of the empennage 26. As shown, in this non-limiting, exemplary embodiment, the empennage 26 includes four identical grid fins 74 radially spaced around the lower end of the lower fuselage segment 14. In a preferred embodiment, each grid fin 74 includes plural hollow cells 76 through which air flows during flight of the aerial vehicle 10. As shown, a single respective rotary electromechanical servo-actuator 78 is connected to each grid fin 74 via a shaft 80. Opposite servos 78 receive identical signals so that the grid fins 74 are actuated in unified pairs. Each grid fin 74 rotates through an axis that extends radially from the longitudinal axis 20.

It is to be understood that the powerplant 48 rotates the rotor 52 which provides lift for the aerial vehicle 10. With the grid fins 74 aligned with the air flow caused by the rotor 52, the aerial vehicle 10 can take-off vertically and land vertically. During flight, the turning vanes 28 can be rotated in unison about their hinged ends, e.g., in response to a signal from the remote control unit 34, in order to change the direction of air flowing across the turning vanes 28 and thus, rotate the aerial vehicle 10 about its longitudinal axis 20. If the aerial vehicle 10 is vertically oriented, this motion is considered yaw. On the other hand, if the aerial vehicle 10 is horizontal, this motion is considered roll.

The grid fins 74 can be used to alter the direction of air flowing therethrough and alter the direction in which the aerial vehicle 10 is traveling. Thus, the grid fins 74 can be used to redirect the aerial vehicle 10 during vertical flight or horizontal flight or completely transition the aerial vehicle 10 between a vertical flight mode and a horizontal flight mode.

Figure 5:
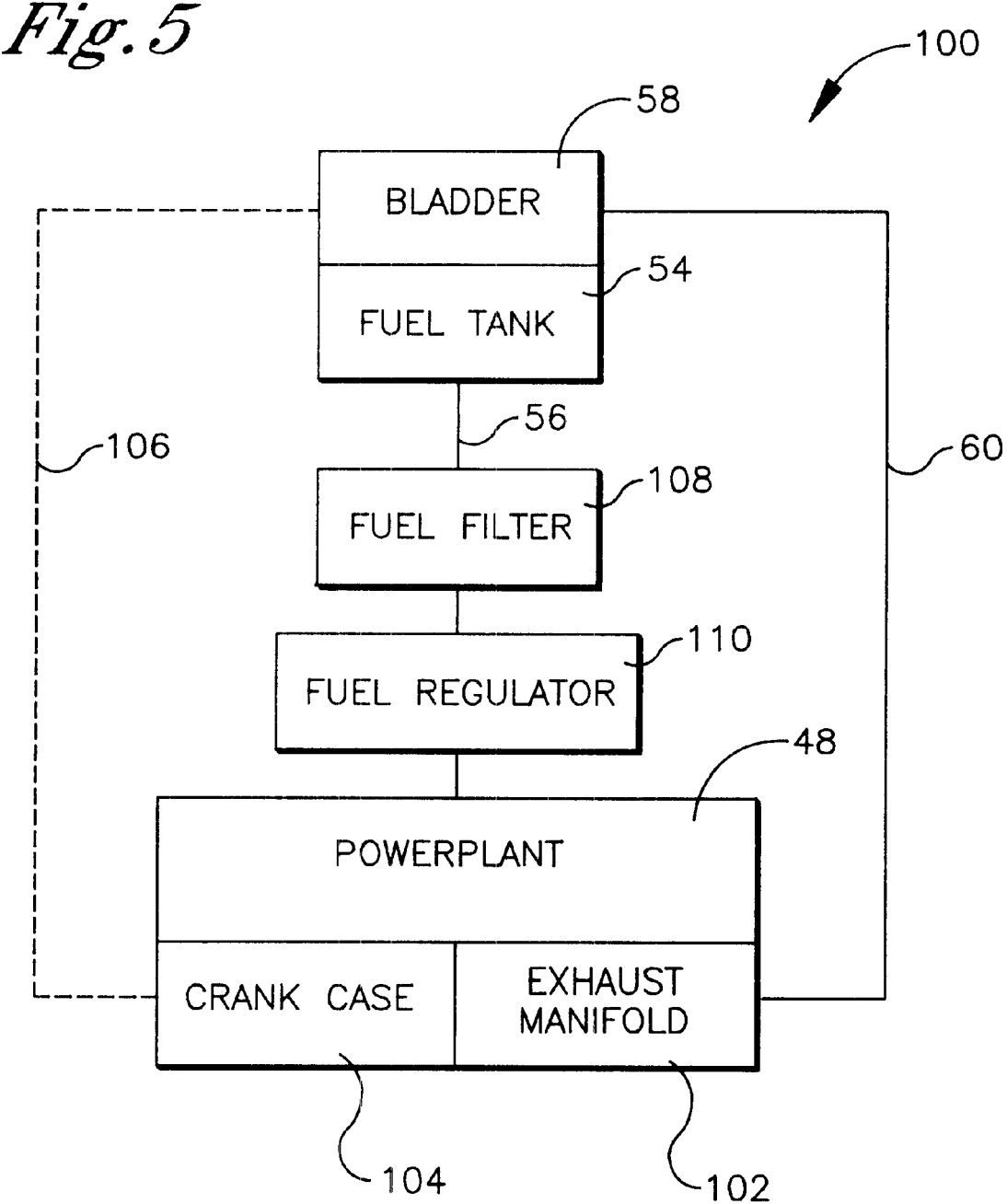
FIG. 5 is a block diagram of a fuel system.

Referring to FIG. 5, one non-limiting exemplary fuel system is shown and generally designated 100. FIG. 5 shows that the fuel system 100 includes the fuel tank 54 (FIG. 2) and bladder 58 (FIG. 2) that are connected to the powerplant 48 (FIG. 2) via the fuel line 56 (FIG. 2) and the pressure line 60 (FIG. 2).

As shown in FIG. 5, the bladder 58 is preferably connected to an exhaust manifold 102 by the pressure line 60. However, it is to be understood that the bladder 58 can be connected to a crankcase 104 as indicated by dashed line 106. FIG. 5 shows that the fuel system 100 can include a fuel filter 108 and a fuel regulator 110 installed along the fuel line 56 between the fuel tank 54 and the engine 48. Preferably, the fuel filter 108 is installed between the fuel tank 54 and the fuel regulator 110. The fuel regulator 110 is used to prevent excessive fuel pressure during start-up, idle, or shut-down, and thus, to prevent engine flooding or hydrolock. Moreover, the fuel filter 108 is used to ensure that the fuel delivered to the powerplant 48 is clean and free of debris that can adversely affect the performance and life span of the powerplant 48 and the fuel regulator 110.

In general, the fuel filter 108 is situated so that it can be removed, inspected, and, if necessary, replaced during routine maintenance of the aerial vehicle 10. On the other hand, the fuel regulator 110 is not typically replaced on a regular basis and accordingly, is mounted in a location within the upper fuselage segment 12 that is not as easily accessible as the fuel filter 108.

Figure 6:
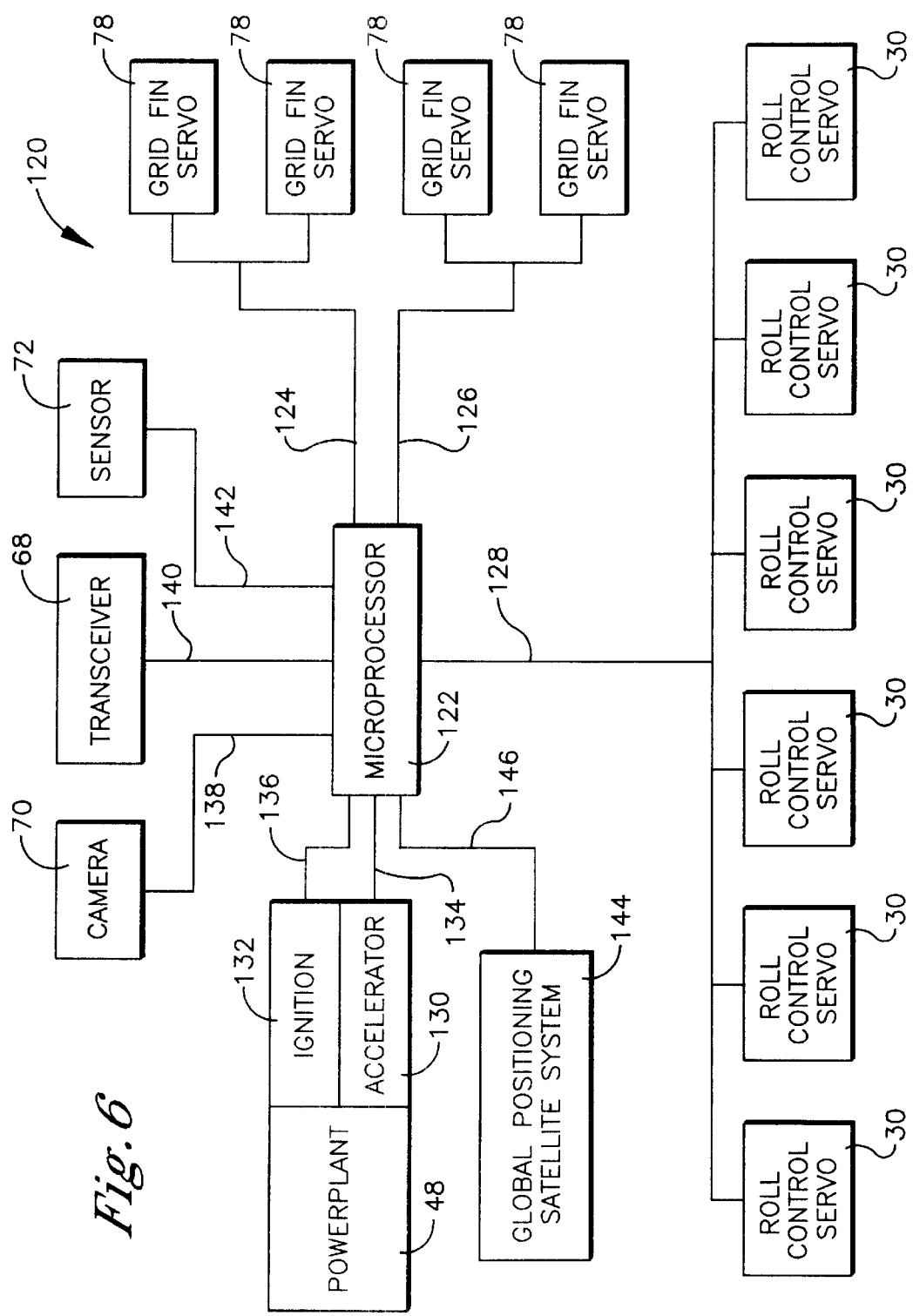
FIG. 6 is a block diagram of a control system.

Referring now to FIG. 6, one exemplary, non-limiting control system is shown and generally designated 150. FIG. 6 shows that the control system 150 includes a microprocessor 122 to which the subcomponents, described below, are attached. As shown, the microprocessor 122 is connected to the grid fin servos 78 (FIG. 4) via electrical lines 124 and 126. The grid fin servos 78 are connected in pairs so that opposite pairs of grid fin servos 78 receive the same signals. The microprocessor 122 is also connected to the roll control servos 30 (FIG. 1) via electrical line 128. The roll control servos 30 are connected so that all six roll control servos 30 receive identical signals simultaneously.

As shown in FIG. 6, the microprocessor 122 is connected to the powerplant 48, e.g., the accelerator 130 and ignition system 132, via electrical lines 134 and 136 in order to control the operation thereof. The microprocessor 122 is also connected to the sensor 68 (FIG. 2), the camera 70 (FIG. 2), and the transceiver 72 by electrical lines 138, 140 and 142. As shown, the microprocessor 122 can also be connected to a global positioning satellite (G.P.S.) system 144 by electrical line 146.

Accordingly, with the above described control system 120 the microprocessor 122 can be used to control the flight of the aerial vehicle 10 by controlling the operation of the grid fin servos 78, the roll control servos 30, the engine accelerator 130 and ignition system 132 in response to remote control signals from the remote 34. Or, the microprocessor 122 can control the flight of the aerial vehicle 10 in response to a pre-programmed flight plan. The microprocessor 122 can also send and receive information via the transceiver 72. This information can be control signals from the remote control unit 34, sensor signals, video or stills from the camera 70, or any other information relevant to the flight of the aerial vehicle 10.

With the configuration of structure and method described above, it can be appreciated that the aerial vehicle 10 can take off and land vertically. Moreover, during flight the aerial vehicle 10 can hover while vertical and transition between a vertical flight mode and a horizontal flight mode.

While the particular CONVERTIBLE VERTICAL TAKE-OFF AND LANDING MINIATURE AERIAL VEHICLE as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. An aerial vehicle, comprising:
   a rotor guard assembly;
   an upper fuselage segment extending upwardly from the rotor guard assembly;
   a lower fuselage segment extending downwardly from the rotor guard assembly;
   at least one rotor rotating within the rotor guard assembly between the upper fuselage segment and the lower fuselage segment;
   at least one turning vane flap extending from the rotor guard assembly below the rotor; and
   at least one grid fin extending radially from the lower fuselage segment below the turning vane flap, the grid fin allowing the aerial vehicle to transition between a vertical flight mode and a horizontal flight mode.

2. The aerial vehicle of claim 1, further comprising:
   an undercarriage extending downwardly from the outer periphery of the rotor guard assembly.

3. The aerial vehicle of claim 2, further comprising:
   a powerplant installed in the lower fuselage segment adjacent to the rotor guard assembly, the power plant having a shaft extending between the lower fuselage segment and the upper fuselage segment, the rotor being rigidly attached to the shaft.

4. The aerial vehicle of claim 3, further comprising:
   a fuel tank installed in the upper fuselage segment adjacent to the rotor guard assembly.

5. The aerial vehicle of claim 4, wherein the fuel tank includes a bladder installed therein, the bladder being inflatable to pressurize fuel in the fuel tank.

6. The aerial vehicle of claim 5, further comprising:
   a fuel line leading from the fuel tank to the powerplant, the fuel line being routed at least partially external to the rotor guard assembly.

7. The aerial vehicle of claim 6, further comprising:
   a high pressure line leading from the powerplant to the bladder within the fuel tank, the high pressure line being routed at least partially external to the rotor guard assembly.

8. The aerial vehicle of claim 7, further comprising:
   an upper cap installed on the upper fuselage segment.

9. The aerial vehicle of claim 8, further comprising:
   at least one sensor disposed within the upper cap.

10. The aerial vehicle of claim 9, wherein the sensor is at least one of the following: an optical sensor, an infrared (IR) sensor, a radio frequency (RF) sensor, a magnetic field sensor, a chemical sensor, an acoustic sensor, and a motion sensor.

11. The aerial vehicle of claim 10, further comprising:
    at least one camera disposed within the upper cap.

12. The aerial vehicle of claim 11, wherein the camera is at least one of the following: a video camera, a still camera, a digital video camera, a digital still camera, a color video camera, a black-and-white video camera, a thermal imaging camera, an infrared video camera, and a night vision camera.

13. The aerial vehicle of claim 12, further comprising:
    at least one microprocessor within the upper fuselage segment.

14. The aerial vehicle of claim 13, further comprising:
    at least one transceiver connected to the microprocessor and extending through the upper cap.

15. The aerial vehicle of claim 14, further comprising:
    at least one global positioning satellite system within the upper fuselage segment and connected to the microprocessor.

16. An aerial vehicle, comprising:
    a fuselage defining a longitudinal axis;
    a rotor guard assembly surrounding at least a portion of the fuselage in a plane perpendicular to the longitudinal axis;
    at least one rotor rotating within the rotor guard assembly in a plane perpendicular to the longitudinal axis;
    at least one turning vane flap extending downwardly from the rotor guard, the turning vane flap having one end hingedly attached to the rotor guard, the turning vane flap rotating about a radial axis extending radially from the longitudinal axis; and
    at least one grid fin extending radially from the fuselage below the, turning vane flap, the grid fin rotating about a central axis extending radially from the longitudinal axis.

17. The aerial vehicle of claim 16, further comprising:

an undercarriage extending downwardly from the outer periphery of the rotor guard assembly.

18. The aerial vehicle of claim 17, further comprising:

a powerplant installed in the fuselage adjacent to the rotor guard assembly, the power plant having a shaft extending into the rotor guard assembly, the rotor being rigidly attached to the shaft.

19. The aerial vehicle of claim 18, further comprising:

a fuel tank installed in the fuselage adjacent to the rotor guard assembly opposite the power plant.

20. The aerial vehicle of claim 19, wherein the fuel tank includes a bladder installed therein, the bladder being inflatable to pressurize fuel in the fuel tank.

21. The aerial vehicle of claim 20, further comprising:

a fuel line leading from the fuel tank to the powerplant, the fuel line being routed at least partially external to the rotor guard assembly.

22. The aerial vehicle of claim 21, further comprising:

a high pressure line leading from the powerplant to the bladder within the fuel tank, the high pressure line being routed at least partially external to the rotor guard assembly.

23. The aerial vehicle of claim 22, further comprising:

an upper cap installed on an upper end defined by the fuselage.

24. The aerial vehicle of claim 23, further comprising:

at least one sensor disposed within the upper cap.

25. The aerial vehicle of claim 24, wherein the sensor is at least one of the following: an optical sensor, an infrared (IR) sensor, a radio frequency (RF) sensor, a magnetic field sensor, a chemical sensor, and an acoustic sensor.

26. The aerial vehicle of claim 25, further comprising:

at least one camera disposed within the upper cap.

27. The aerial vehicle of claim 26, wherein the camera is at least one of the following: a video camera, a still camera, a digital video camera, a digital still camera, a color video camera, a black-and-white video camera, a thermal imaging camera, an infrared video camera, and a night vision camera.

28. The aerial vehicle of claim 27, further comprising:

at least one microprocessor within the fuselage.

29. The aerial vehicle of claim 28, further comprising:

at least one transceiver connected to the microprocessor and extending through the upper cap.

30. The aerial vehicle of claim 29, further comprising:

at least one global positioning satellite system within the fuselage segment and connected to the microprocessor.

\* \* \* \* \*